(12) United States Patent
Luo

(10) Patent No.: US 6,612,115 B2
(45) Date of Patent: *Sep. 2, 2003

(54) METHOD OF CONDUCTING THERMAL ENERGY, THERMAL CONDUCTOR, AND ELECTRICAL APPLIANCE USING THE THERMAL CONDUCTOR

(76) Inventor: Chin-Kuang Luo, 5F, No. 56, Min-Chuan Rd., Chung Dist., Taichung City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/078,037

(22) Filed: Feb. 19, 2002

(65) Prior Publication Data

US 2003/0084669 A1 May 8, 2003

(30) Foreign Application Priority Data

Nov. 5, 2001 (TW) .......................... 90127426 A

(51) Int. Cl.[7] .......................... F25B 21/02; F17C 13/00
(52) U.S. Cl. .......................... 62/3.6; 62/457.9
(58) Field of Search .......................... 62/3.6, 3.3, 3.62, 62/457.9, 457.6; 219/401, 402, 430, 439, 385, 386, 620, 621

(56) References Cited

U.S. PATENT DOCUMENTS

| | | | | |
|---|---|---|---|---|
| 4,505,252 A | * | 3/1985 | Wada et al. | 126/246 |
| 5,125,391 A | * | 6/1992 | Srivastava et al. | 126/246 |
| 5,643,485 A | * | 7/1997 | Potter et al. | 219/621 |
| 5,893,709 A | | 4/1999 | Leicht | 432/152 |
| D425,611 S | | 5/2000 | Qu | D23/386 |
| 6,132,823 A | | 10/2000 | Qu | 428/34.6 |
| 6,320,166 B1 | * | 11/2001 | Park | 219/439 |

FOREIGN PATENT DOCUMENTS

WO   WO 00/54638   9/2000

OTHER PUBLICATIONS

Patent Abstracts of Japan No. 8112207.
Patent Abstracts of Japan No. 8089396.
Patent Abstracts of Japan No. 8089395.
Patent Abstracts of Japan No. 8084670.

* cited by examiner

*Primary Examiner*—Chen-Wen Jiang
(74) *Attorney, Agent, or Firm*—Trop, Pruner & Hu, P.C.

(57) ABSTRACT

In a method of conducting thermal energy, a hollow member is formed from a heat-conducting material and has inner and outer walls that confine an enclosed chamber therebetween. The chamber is filled with a superconductor material. The hollow member is subjected to a thermal energy source. A thermal conductor formed according to the aforesaid method can be incorporated in a cooking utensil, or in an electrical appliance, to permit quick and efficient conduction of thermal energy.

7 Claims, 7 Drawing Sheets

METHOD OF CONDUCTING THERMAL ENERGY, THERMAL CONDUCTOR, AND ELECTRICAL APPLIANCE USING THE THERMAL CONDUCTOR

CROSS-REFERENCE TO RELATED APPLICATION

This application claims priority of Taiwan Patent Application No. 90127426, filed on Nov. 5, 2001.

BACKGROUND OF THE INVENTION

1. Field of the Invention

The invention relates to a method of conducting thermal energy, more particularly to a method of conducting thermal energy which can be used in a cooking utensil or an electrical appliance to permit quick and efficient conduction of thermal energy.

2. Description of the Related Art

FIG. 1 shows a conventional portable icebox which includes a housing 101 confining an enclosed chamber, a metal plate 102 mounted on an upper surface of a bottom wall of the housing 101, a thermoelectric cooling unit 103 disposed in the bottom wall of the housing 101 and having one side in contact with the metal plate 102, and an electric power supply 104 connected to the thermoelectric cooling unit 103 to supply electric power to the latter. In use, when electric currents flow through the thermoelectric cooling unit 103, the heat in the chamber is absorbed by the thermoelectric cooling unit 103 via the metal plate 102 and is released to the exterior of the housing 101. However, as the thermal conductivity of the metal plate 102 is not good, it takes one to two hours to lower the temperature inside the chamber for cold storage purposes. Besides, the temperature inside the chamber will quickly rise once the housing 101 is opened, and it takes another one or two hours to lower the temperature inside the chamber. This entails a large amount of energy loss, and the efficiency is very low.

SUMMARY OF THE INVENTION

Therefore, the main object of the present invention is to provide a method of conducting thermal energy in a quick and efficient manner.

Another object of the present invention is to provide a thermal conductor employed in the aforesaid method.

A further object of the present invention is to provide an electrical appliance that incorporates the aforesaid thermal conductor.

According to one aspect of the present invention, a method of conducting thermal energy includes: forming a hollow member made of a heat-conducting material and having inner and outer walls that confine an enclosed chamber therebetween; filling the chamber with a superconductor material; and subjecting the hollow member to a thermal energy source, the energy being one of a solar energy, a burner, an electric heater, and a thermoelectric cooling unit.

According to another aspect of the present invention, a thermal conductor includes a hollow member made of a heat-conducting material and having inner and outer walls that confine an enclosed chamber therebetween, and a superconductor material that fills the chamber. The hollow member is formed as a cookware body.

According to a further aspect of the present invention, an electrical appliance includes: a thermal conductor including a hollow member that is made of a heat-conducting material and that has inner and outer walls confining an enclosed chamber therebetween, and a superconductor material that fills the chamber; an electrically operable thermal energy source in contact with the thermal conductor; and an electric power supply connected to the thermal energy source for supplying electric power thereto.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
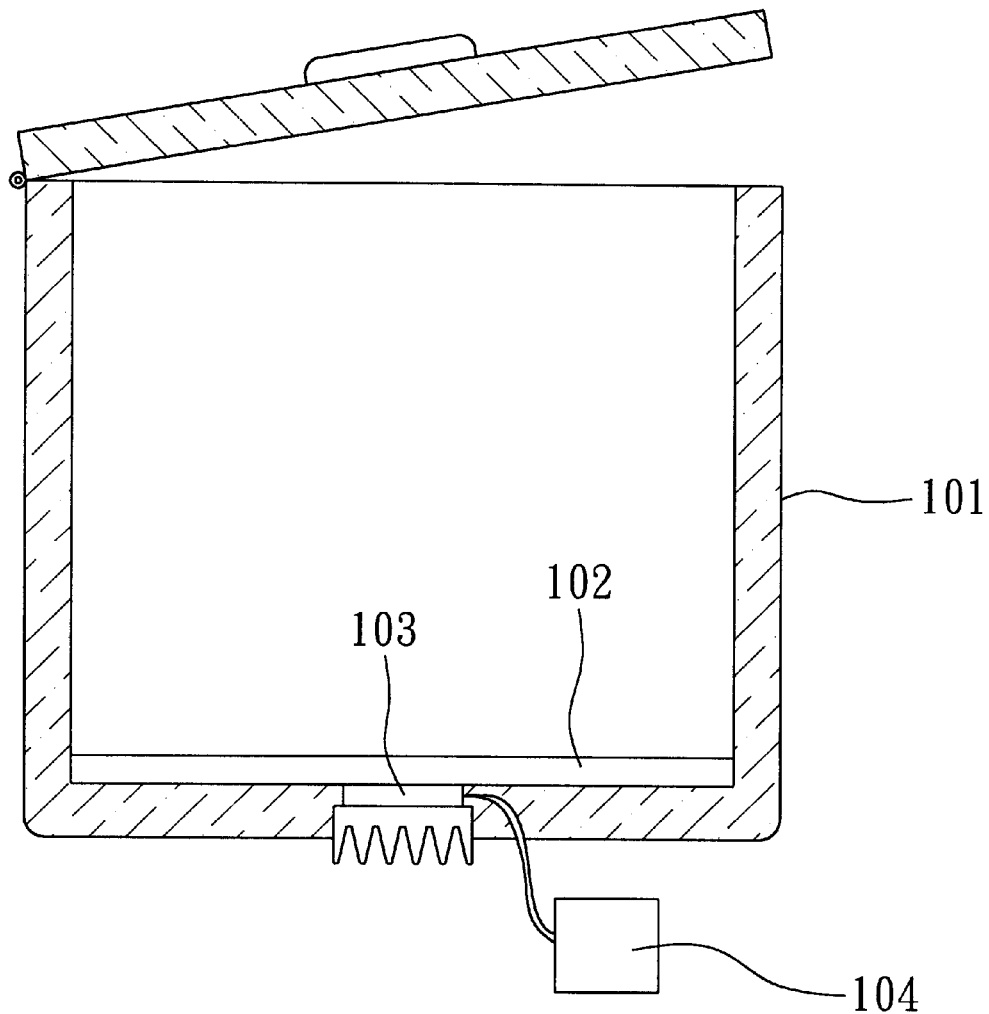
FIG. 1 is a schematic sectional view of a conventional portable icebox having a thermoelectric cooling unit mounted in a bottom wall of a housing thereof.

Before the present invention is described in greater detail, it should be noted that like elements are denoted by the same reference numerals throughout the disclosure.

Figure 2:
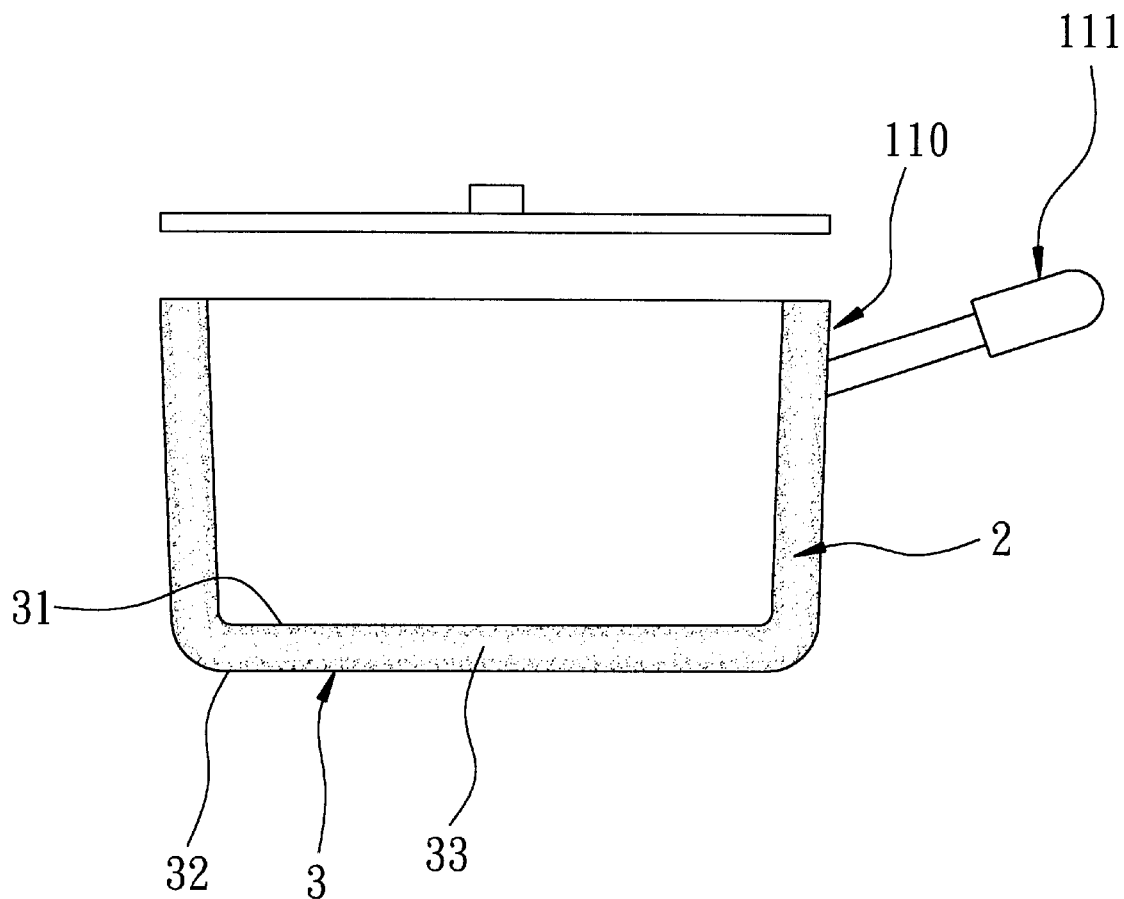
FIG. 2 is a schematic partly sectional view illustrating a pot that embodies a thermal conductor according to the present invention.
Figure 3:
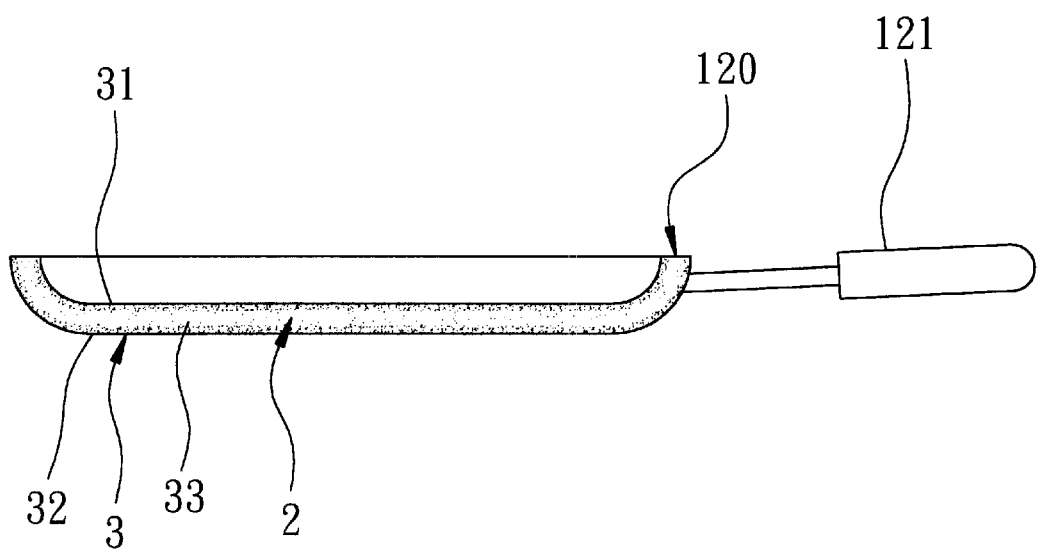
FIG. 3 is a schematic partly sectional view illustrating a pan that embodies the thermal conductor according to the present invention.

Referring to FIGS. 2 and 3, the preferred embodiment of a method of conducting thermal energy according to the present invention includes: forming a hollow member 3 made of a heat-conducting material and having inner and outer walls 31, 32 that confine a vacuum enclosed chamber 33 therebetween; filling the chamber 33 with a superconductor material 2; and subjecting the hollow member 3 to a thermal energy source. The energy source is one of a solar energy source, a burner, an electric heater, and a thermoelectric cooling unit. It is noted that the superconductor material 2 can quickly distribute all over the vacuum interior of the chamber 33 by virtue of the self-adhesion characteristic thereof. Due to the superconductor material 2, thermal energy from the energy source can be transmitted effectively throughout the hollow member 3. In this embodiment, the superconductor material 2 is prepared from inorganic elements to inhibit generation of hydrogen and oxygen molecules so as to avoid possible explosion. The hollow member 3 is preferably formed from a metal material so as to be able to adapt to a temperature ranging from −50° C. to the melting point of metals (about 1700° C.). In this embodiment, the hollow member 3 can be formed from aluminum, copper, metal alloys or other non-metal materials with good thermal conductivity. A thermal conductor employed in the method of the invention includes a hollow member 3 made of a heat-conducting material and having inner and outer walls 31, 32 that confine an enclosed chamber 33 therebetween; and a superconductor material 2 that fills the chamber 33. The hollow member 3 can be formed as a pot body 110 having a handle 111 connected thereto, such as that shown in FIG. 2, or a pan body 120 having a handle 121 connected thereto, such as that shown in FIG. 3.

Figure 4:
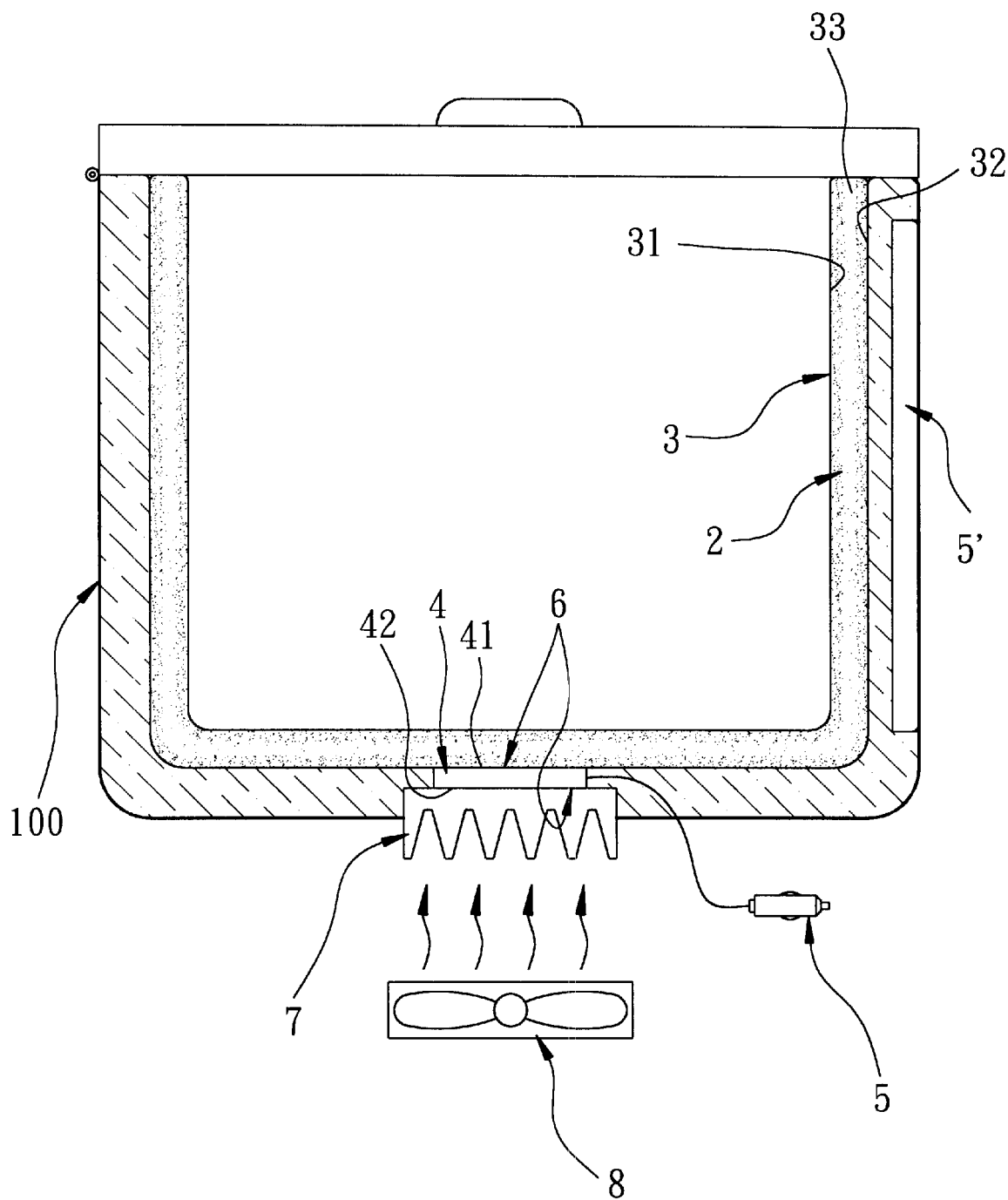
FIG. 4 is a schematic partly sectional view of an icebox according to the present invention.
Figure 5:
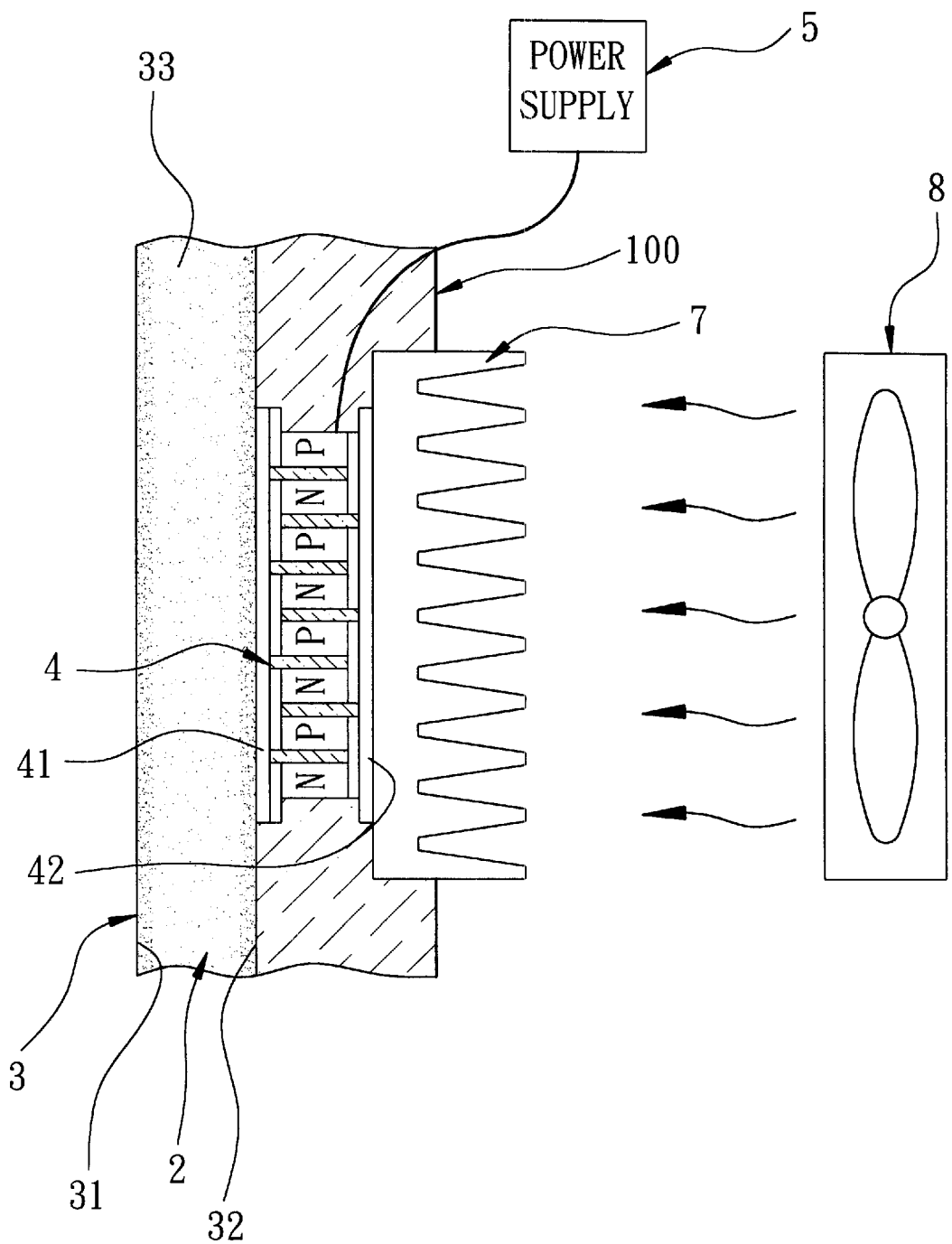
FIG. 5 is an enlarged fragmentary view of FIG. 4.

The thermal conductor can be incorporated in an electrical appliance to permit quick conduction of thermal energy. FIG. 4 shows an icebox according to the present invention. In this embodiment, the hollow member 3 is surrounded by an insulator housing 100. An electrically operable thermal energy source in the form of a thermoelectric cooling unit 4 is disposed in contact with the hollow member 3. An electric power supply 5 is connected to the thermoelectric cooling unit 4 for supplying electric power thereto. The thermoelectric cooling unit 4 has a heat-absorbing side 41 in contact with the outer wall 32 of the hollow member 3 externally of the chamber 33, and a heat-releasing side 42 opposite to the heat-absorbing side 41. The heat-releasing side 42 has a heat sink 7 disposed thereon. A heat conducting material 6, such as a heat conducting paste, can be applied to both the heat absorbing side 41 and the heat-releasing side 42 to enable attachment of the heat-absorbing side 41 of the thermoelectric cooling unit 4 to the outer wall 32 of the hollow member 3 and attachment of the heat sink 7 to the heat-releasing side 42. To enhance the heat-dissipating effect, a fan 8 can be further disposed to induce air currents toward the heat sink 7. In this embodiment, the thermoelectric cooling unit 4 is a semiconductor device that includes an array of heat-insulated N-type and P-type semiconductor units, as best shown in FIG. 5.

Furthermore, the electric power supply 5 can be an alternating current adapter, an automobile lighter socket plug, or a battery unit 5' mounted on the housing 100. In use, when electric currents pass through the thermoelectric cooling unit 4, by virtue of the characteristic of the superconductor material 2 inside the chamber 33, heat in a space confined by the hollow member 3 will be "pumped out" instantly to thereby lower the temperature rapidly in the space.

Figure 6:
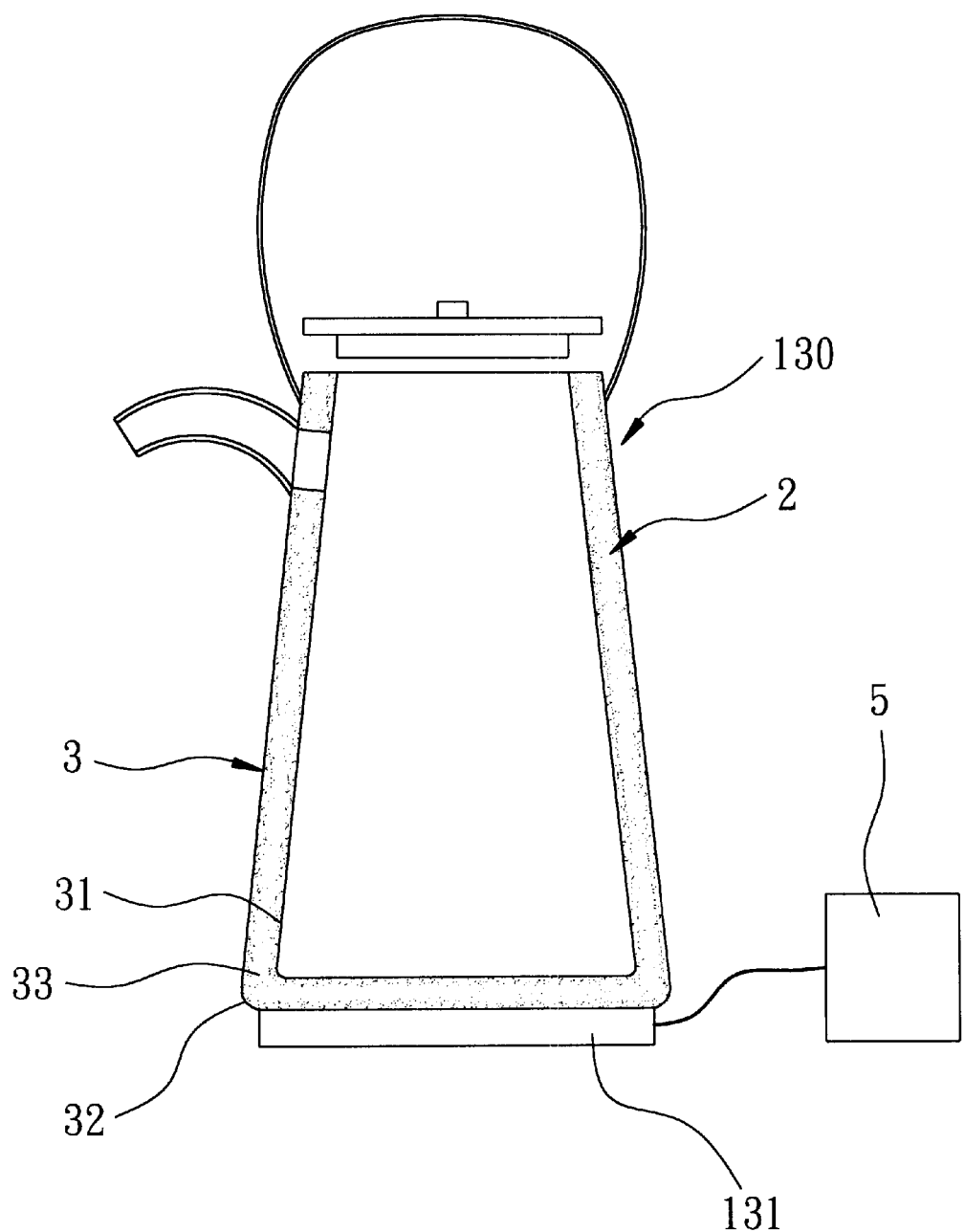
FIG. 6 is a schematic partly sectional view of an electric water kettle according to the present invention.

Referring to FIG. 6, the hollow member 3 forms a part of an electric water kettle 130, and the thermal energy source is an electric heater 131 mounted on the outer wall 32 of the hollow member 3 and connected electrically to an electric power supply 5.

Figure 7:
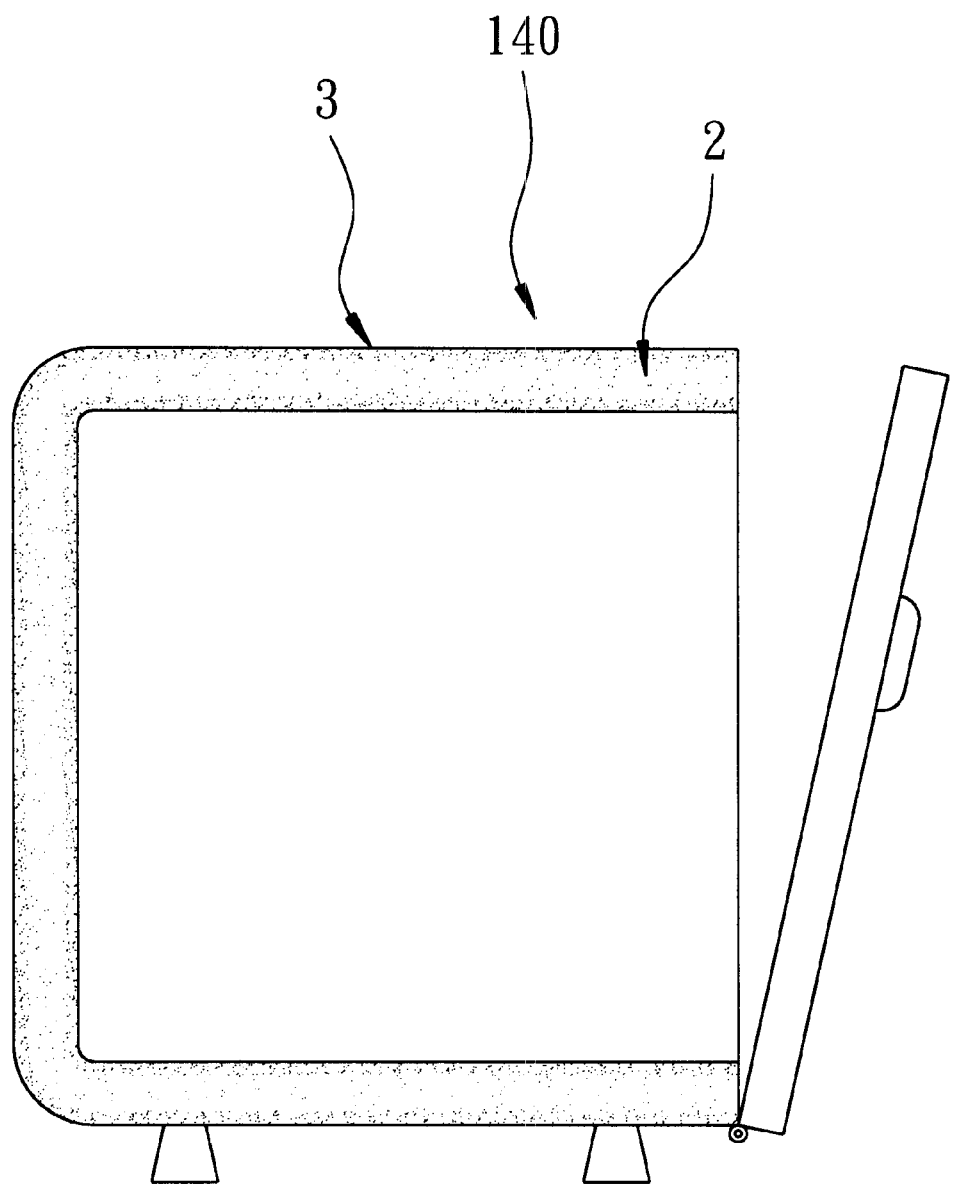
FIG. 7 is a schematic partly sectional view of an electric oven according to the present invention.

Referring to FIG. 7, the hollow member 3 forms a part of a housing of an electric oven 140.

It can thus be appreciated from the foregoing that, as compared to the aforesaid prior art which entails huge energy loss but does not achieve satisfactory efficiency, the present invention permits quick and efficient conduction of thermal energy.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An electrical appliance comprising:
    a thermal conductor including a hollow member that is made of a heat-conducting material and that has inner and out walls confining an enclosed chamber therebetween, and a superconductor material that fills said chamber;
    an electrically operable thermal energy source in contact with said thermal conductor;
    an electric power supply connected to said thermal energy source for supplying electric power thereto; and
    wherein said thermal energy source is a thermoelectric cooling unit having a heat-absorbing side in contact with said outer wall of said hollow member externally of said chamber, and a heat-releasing side opposite to said heat-absorbing side, said heat-releasing side having a heat sink disposed thereon.

2. The electrical appliance as claimed in claim 1, further comprising a fan disposed to induce air currents toward said heat sink.

3. The electrical appliance as claimed in claim 1, wherein said thermoelectric cooling unit is a semiconductor device that includes an array of heat-resistant N-type and P-type semiconductor unit.

4. The electrical appliance as claimed in claim 1, wherein said electrical power supply is one of an alternating current adapter, an automobile lighter socket plug, or a battery unit.

5. The electrical appliance as claimed in claim 1, wherein said thermal energy source is an electric heater mounted on said outer wall of said hollow member.

6. The electrical appliance as claimed in claim 5, wherein said hollow member forms at least a part of a water kettle.

7. An electrical appliance comprising:
    a thermal conductor including a hollow member that is made of a heat-conducting material and that has inner and outer walls confining an enclosed chamber therebetween, and a superconductor material that fills said chamber;
    an electrically operable thermal energy source in contact with said thermal conductor;
    an electric power supply connected to said thermal energy source for supplying electric power thereto;
    wherein said thermal energy source is an electric heater mounted on said outer wall of said hollow member; and
    wherein said hollow member forms at least a part of an oven housing.

* * * * *